(12) United States Patent
Hamasaki et al.

(10) Patent No.: US 10,161,272 B2
(45) Date of Patent: Dec. 25, 2018

(54) VALVE OPENING AND CLOSING TIMING CONTROL APPARATUS

(71) Applicant: AISIN SEIKI KABUSHIKI KAISHA, Kariya-shi, Aichi-ken (JP)

(72) Inventors: Hiroyuki Hamasaki, Obu (JP); Yuji Noguchi, Obu (JP); Takeo Asahi, Kariya (JP); Toru Sakakibara, Kariya (JP); Tomohiro Kajita, Kariya (JP); Hideyuki Suganuma, Anjo (JP); Tomokazu Harada, Aichi-ken (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 155 days.

(21) Appl. No.: 15/278,712

(22) Filed: Sep. 28, 2016

(65) Prior Publication Data

US 2017/0198611 A1   Jul. 13, 2017

(30) Foreign Application Priority Data

Jan. 8, 2016 (JP) ................... 2016-002628

(51) Int. Cl.

| | |
|---|---|
| *F01L 1/34* | (2006.01) |
| *F01L 1/047* | (2006.01) |
| *F16K 31/06* | (2006.01) |
| *F01L 1/344* | (2006.01) |

(52) U.S. Cl.
CPC ............ *F01L 1/3442* (2013.01); *F01L 1/047* (2013.01); *F01L 1/344* (2013.01); *F16K 31/0613* (2013.01); *F01L 2001/34426* (2013.01); *F01L 2001/34433* (2013.01);
(Continued)

(58) Field of Classification Search
CPC .......... F01L 1/3442; F01L 2001/34433; F01L 2001/34426; F01L 2001/34479; F01L 1/344; F01L 2001/34483; F01L 1/047; F01L 2103/00; F01L 2001/34436; F16K 31/0613
See application file for complete search history.

(56) References Cited

U.S. PATENT DOCUMENTS

| | | | |
|---|---|---|---|
| 2011/0067655 A1* | 3/2011 | Ottersbach | F01L 1/047 123/90.15 |
| 2012/0097122 A1 | 4/2012 | Lichti | |

(Continued)

*Primary Examiner* — Mark Laurenzi
*Assistant Examiner* — Wesley Harris
(74) *Attorney, Agent, or Firm* — Buchanan Ingersoll & Rooney PC

(57) ABSTRACT

A valve opening and closing timing control apparatus includes: a driving side rotor synchronously rotating with a crankshaft of an internal combustion engine; a driven side rotor disposed coaxially with the driving side rotor and synchronously rotating with a camshaft; a fluid pressure chamber formed on at least one of the driving side and driven side rotors, and partitioned into advance angle and retard angle chambers; a bolt member disposed coaxially with a rotary axis of the driven side rotor, connecting the driven side rotor and the camshaft, and provided with a cylindrical portion; a partition body provided with a press-fit portion, and partitioning the cylindrical portion into first and second flow passages; a valve body opening and closing the first flow passage; and a valve housing body accommodating the valve body.

5 Claims, 6 Drawing Sheets

(52) U.S. Cl.
CPC ........ *F01L 2001/34436* (2013.01); *F01L 2001/34479* (2013.01); *F01L 2001/34483* (2013.01); *F01L 2103/00* (2013.01)

(56) References Cited

U.S. PATENT DOCUMENTS

| | | | |
|---|---|---|---|
| 2013/0092113 A1* | 4/2013 | Bohner | F01L 1/46 123/90.15 |
| 2013/0199469 A1* | 8/2013 | Busse | F16K 11/07 123/90.15 |

* cited by examiner

VALVE OPENING AND CLOSING TIMING CONTROL APPARATUS

CROSS REFERENCE TO RELATED APPLICATIONS

This application is based on and claims priority under 35 U.S.C. § 119 to Japanese Patent Application 2016-002628, filed on Jan. 8, 2016, the entire contents of which are incorporated herein by reference.

TECHNICAL FIELD

This disclosure relates to a valve opening and closing timing control apparatus provided with a partition body that partitions a flow passage space for circulating fluid, in an inner side of a bolt that fixes a driven side rotor to a camshaft.

BACKGROUND DISCUSSION

In a valve opening and closing timing control apparatus of an internal combustion engine, an oil control valve (OCV) may be provided in a flow passage space formed in a bolt for fixing a driven side rotor to a camshaft (for example, US 2012/0097122 (Reference 1)). The flow passage space of the bolt is formed coaxially with the driven side rotor, and a partition body that partitions the flow passage space into a flow passage for supplying working fluid to an advance angle chamber or a retard angle chamber and a flow passage for discharging the working fluid from the advance angle chamber or the retard angle chamber is press-fitted into the flow passage space.

In the configuration of Reference 1, when the partition body is press-fitted into the flow passage space of the bolt functioning as a flow passage member, the partition body slides with respect to an inner surface of the bolt, and any of the partition body and the inner surface of the bolt is cut and chips are generated in some case. If the chips intrude into the flow passage, inconvenience is generated such as adverse effect on an operation of the valve disposed in the flow passage.

SUMMARY

Thus, a need exists for a valve opening and closing timing control apparatus which is not suspectable to the drawback mentioned above.

A feature of a valve opening and closing timing control apparatus according to an aspect of this disclosure resides in that the valve opening and closing timing control apparatus includes a driving side rotor that synchronously rotates with a crankshaft of an internal combustion engine, a driven side rotor that is disposed coaxially with the driving side rotor and synchronously rotates with a camshaft of the internal combustion engine, a fluid pressure chamber that is formed on at least one of the driving side rotor and the driven side rotor, and is partitioned into an advance angle chamber and a retard angle chamber, a bolt member that is disposed coaxially with a rotary axis of the driven side rotor, connects the driven side rotor and the camshaft, and is provided with a cylindrical portion coaxial with the rotary axis, a partition body that is provided with a press-fit portion press-fitted into the cylindrical portion and partitions the cylindrical portion into a first flow passage and a second flow passage for use for supplying and discharging working fluid to and from the fluid pressure chamber, a valve body that opens and closes the first flow passage, and a valve housing body that accommodates the valve body, an engaging portion which has a smaller diameter than that of the press-fit portion is provided on the first flow passage side of the press-fit portion, and the valve housing body is provided with an engaged portion which is externally fitted to the engaging portion, and the engaged portion is provided with an abutting portion which abuts on the cylindrical portion and a space is formed which functions as a foreign matter reservoir between the engaged portion and the cylindrical body, and closer to the press-fit portion side than the abutting portion.

A feature of a valve opening and closing timing control apparatus according to another aspect of this disclosure resides in that the valve opening and closing timing control apparatus includes a driving side rotor that synchronously rotates with a crankshaft of an internal combustion engine, a driven side rotor that is disposed coaxially with the driving side rotor and synchronously rotates with a camshaft of the internal combustion engine, a fluid pressure chamber that is formed on at least one of the driving side rotor and the driven side rotor, and is partitioned into an advance angle chamber and a retard angle chamber, a bolt member that is disposed coaxially with a rotary axis of the driven side rotor, connects the driven side rotor and the camshaft, and is provided with a cylindrical portion coaxial with the rotary axis, a partition body that is provided with a press-fit portion press-fitted into the cylindrical portion, and partitions the cylindrical portion into a first flow passage and a second flow passage for use for supplying and discharging working fluid to and from the fluid pressure chamber, a valve body that opens and closes the first flow passage, and a valve housing body that accommodates the valve body, and an engaging portion which has a smaller diameter than that of the press-fit portion is provided on the first flow passage side of the press-fit portion, the valve housing body is provided with an engaged portion which is externally fitted to the engaging portion, a small diameter portion is provided which abuts on the engaged portion in the bolt member and a space is formed which functions as a foreign matter reservoir between the engaged portion and the cylindrical body, and closer to the press-fit portion side than the small diameter portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to drawings.

Basic Configuration

Figure 1:
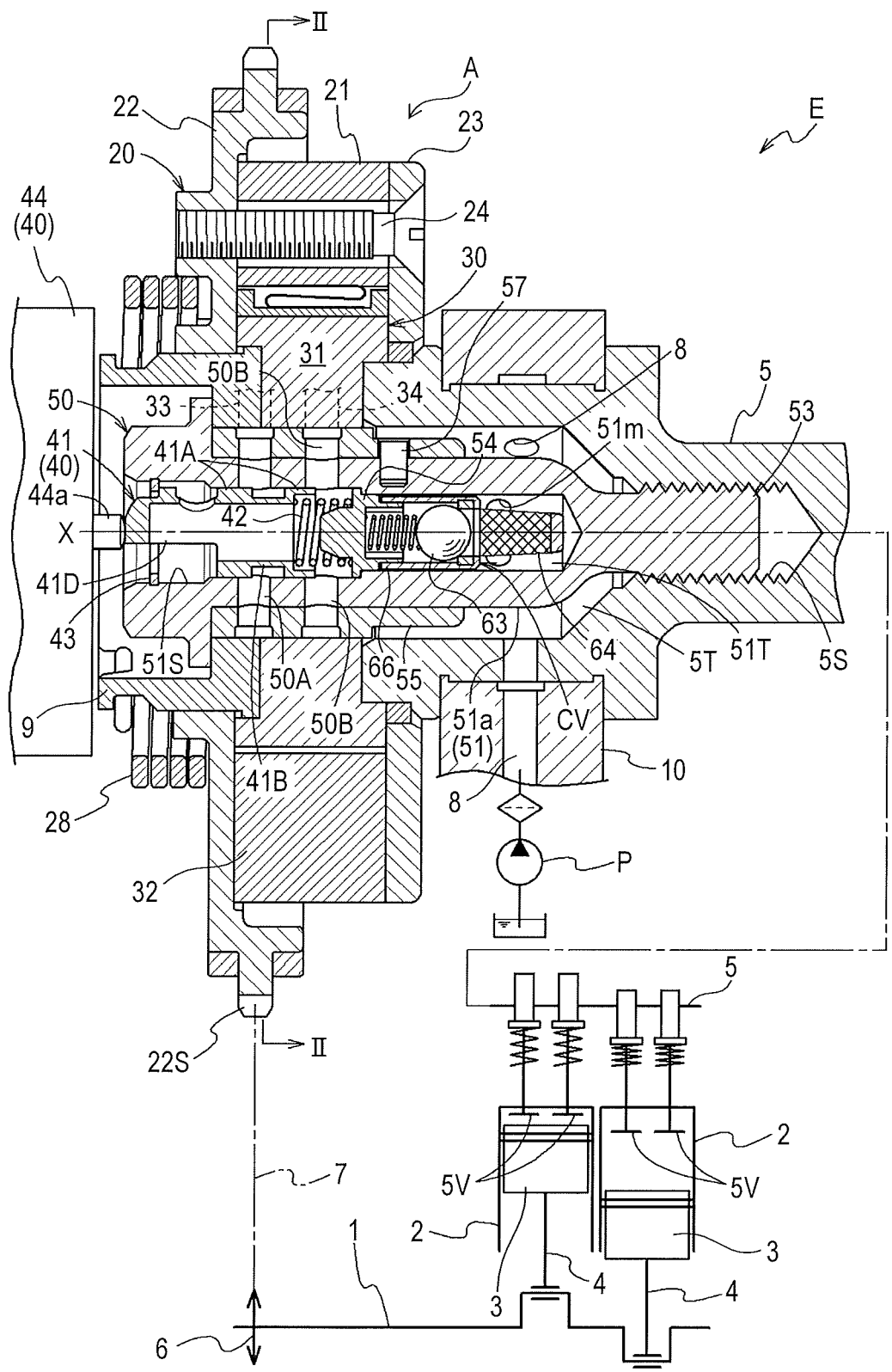
FIG. 1 is a sectional view illustrating an entire configuration of a valve opening and closing timing control apparatus.
Figure 2:
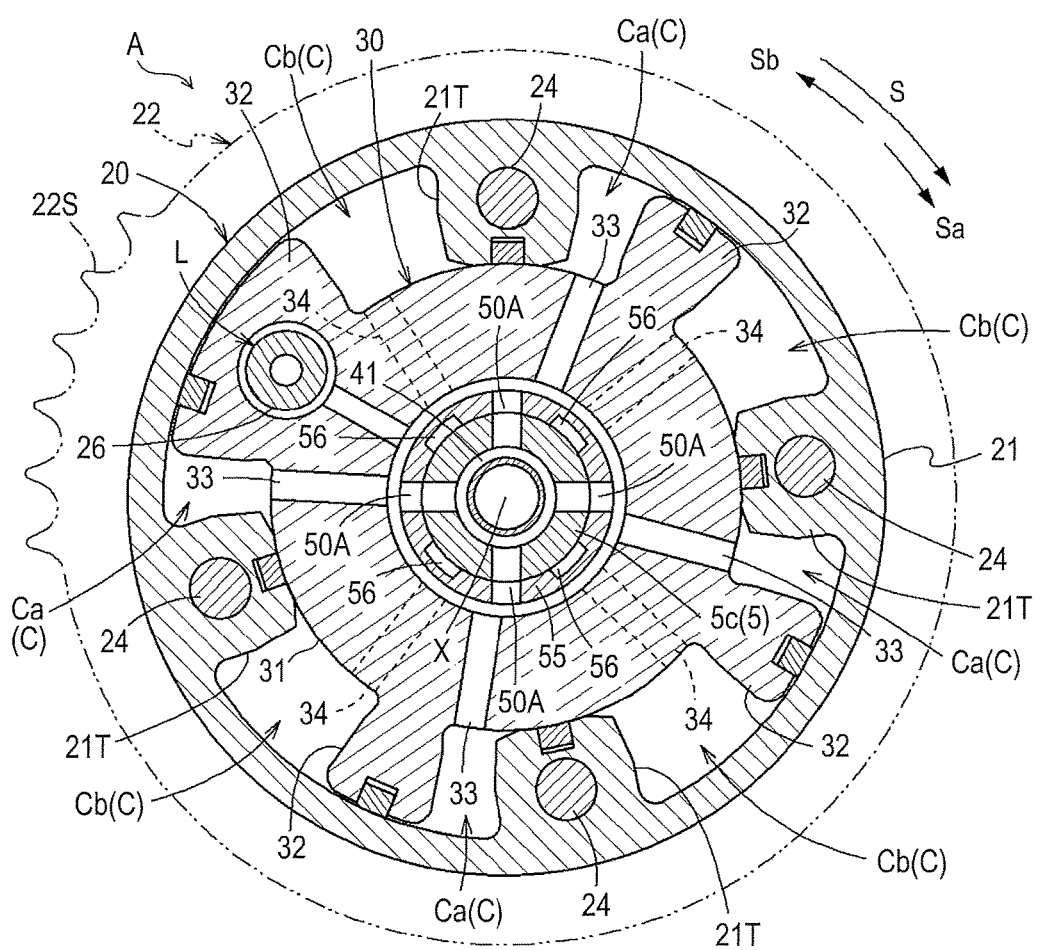
FIG. 2 is a sectional view taken along line II-II in FIG. 1.

As illustrated in FIG. 1 and FIG. 2, a valve opening and closing timing control apparatus A is configured to include an external rotor 20 as a driving side rotor, an internal rotor 30 as a driven side rotor, and a solenoid control valve 40 controlling a hydraulic oil as a working fluid.

The internal rotor 30 (one example of the driven side rotor) is disposed coaxially with a rotary axis X of an intake camshaft 5, and is screwed and connected to the intake camshaft 5 by a connecting bolt 50 so as to rotate integrally. The external rotor 20 (one example of the driving side rotor) is disposed on the coaxial core with the rotary axis X, and is relatively rotatably supported to the internal rotor 30 by containing the internal rotor 30. This external rotor 20 synchronously rotates with a crankshaft 1 of an engine E as an internal combustion engine.

The solenoid control valve 40 is provided with an electromagnetic solenoid 44 supported by the engine E, and is provided with a spool 41 and a spool spring 42 accommodated in a spool chamber 51S of the connecting bolt 50.

The electromagnetic solenoid 44 is provided with a plunger 44a disposed at the coaxial core with the rotary axis X so as to abut on an outer end portion of the spool 41, and sets the amount of projection of the plunger 44a to set an operation position of the spool 41 by control of electric power to be supplied to the inside of a solenoid. Thereby, the electromagnetic solenoid 44 controls the hydraulic oil (one example of the working fluid), and a relative rotational phase of the external rotor 20 and the internal rotor 30 is set by control of the hydraulic oil. Therefore, control of an opening and closing timing of an intake valve 5V is realized.

Engine and the Valve Opening and Closing Timing Control Apparatus

What is provided in a vehicle such as a passenger car is indicated as the engine E (one example of the internal combustion engine) in FIG. 1. The engine E accommodates a piston 3 in an inner side of a cylinder bore in a cylinder block 2 of the upper position, and is configured with four-cycle type to connect the piston 3 and the crankshaft 1 with a connecting rod 4. The intake camshaft 5 opening and closing the intake valve 5V and an exhaust camshaft (not illustrated) are provided in upper side of the engine E.

In an engine constituting member 10 rotatably supporting the intake camshaft 5, a supply flow passage 8 is formed to supply the hydraulic oil from a hydraulic pump P (one example of the fluid pressure pump) driven by the engine E. The hydraulic pump P supplies lubricating oil stored in the oil pan of the engine E to the solenoid control valve 40 as the hydraulic oil (one example of the working fluid) via the supply flow passage 8.

A timing chain 7 is wound over an output sprocket 6 formed in the crankshaft 1 of the engine E and a timing sprocket 22S of the external rotor 20. Thereby, the external rotor 20 synchronously rotates with the crankshaft 1. A sprocket is provided to the front end of the exhaust camshaft of exhaust side, and a timing chain 7 is wound in this sprocket.

As illustrated in FIG. 2, the external rotor 20 rotates toward a driving rotational direction S by the driving force from the crankshaft 1. The direction in which the internal rotor 30 is relatively rotated in the same direction as the driving rotational direction S with respect to the external rotor 20 is referred to as an advance angle direction Sa, and the reverse direction thereof is referred to as a retard angle direction Sb. In this valve opening and closing timing control apparatus A, a relationship between the crankshaft 1 and the intake camshaft 5 is set so as to increase an intake air compression ratio in accordance with increase of the amount of displacement when the relative rotational phase is displaced in the advance angle direction Sa, and so as to reduce the intake air compression ratio in accordance with the increase of the amount of displacement when the relative rotational phase is displaced in the retard angle direction Sb.

Although the valve opening and closing timing control apparatus A is provided in the intake camshaft 5 in this embodiment, the valve opening and closing timing control apparatus A may be provided in the exhaust camshaft, or may be provided in both of the intake camshaft 5 and the exhaust camshaft.

The external rotor 20 includes an external rotor main body 21, a front plate 22, and a rear plate 23, and these portions are integrated by engagement of a plurality of fastening bolts 24. The timing sprocket 22S is formed on an outer periphery of the front plate 22. An annular member 9 is relatively rotatably disposed on an inner periphery of the front plate 22, and a bolt head 52 of the connecting bolt 50 is crimped with respect to this annular member 9. Therefore, this annular member 9, an internal rotor main body 31, and the intake valve 5V are integrated.

Hydraulic Control Configuration

A plurality of projecting portions 21T projecting towards the inside in a radial direction are integrally formed in the external rotor main body 21. The internal rotor 30 includes the cylindrical internal rotor main body 31 which is brought into close contact with the projecting portion 21T of the external rotor main body 21, and four vane portions 32 which project towards the outside in the radial direction from the outer periphery of the internal rotor main body 31 so as to come into contact with an inner peripheral surface of the external rotor main body 21.

Thereby, the external rotor 20 contains the internal rotor 30, and the plurality of fluid pressure chambers C are formed on the outer periphery side of the internal rotor main body 31 at an intermediate position of the projecting portion 21T adjacent to each other in the rotation direction. The fluid pressure chamber C is formed at least one of the external rotor 20 and the internal rotor 30. The hydraulic oil is supplied and discharged to and from the fluid pressure chamber C so that a relative phase between the external rotor 20 and the internal rotor 30 is changed. These fluid pressure chambers C are partitioned by the vane portion 32, and an advance angle chamber Ca and a retard angle chamber Cb are partitioned and formed. An advance angle flow passage 33 communicating with the advance angle chamber Ca is formed in the internal rotor 30, and a retard angle flow passage 34 communicating with the retard angle chamber Cb is formed in the internal rotor 30.

As illustrated in FIG. 1, a torsion spring 28 assisting a displacement of the relative rotational phase between the external rotor 20 and the internal rotor 30 (hereinafter, referred to as the relative rotational phase) to the advance angle direction Sa by the action of biasing force from most retarded angle phase to the advance angle direction Sa is provided over the external rotor 20 and the annular member 9.

A locking mechanism L locking (fixing) the relative rotational phase between the external rotor 20 and the internal rotor 30 in the most retarded angle phase is provided. This locking mechanism L is configured to be provided with a locking member 26 supported freely movable in the direction along the rotary axis X with respect to the one vane portion 32, a locking spring projected and biased this locking member 26, and a locking recess portion formed on the rear plate 23. The locking mechanism L may be configured to be provided with the locking member 26 guided so as to be moved along the radial direction.

The relative rotational phase reaches the most retarded angle phase. Therefore, the locking member 26 is engaged with the locking recess portion by the biasing force of the locking spring, and this locking mechanism L serves to maintain the relative rotational phase to the most retarded angle phase. In a case where the advance angle flow passage 33 communicates with the locking recess portion, and the hydraulic oil is supplied to the advance angle flow passage 33, the locking mechanism L is also configured to perform lock releasing to detach the locking member 26 from the locking recess portion by a hydraulic oil pressure.

Connecting Bolt

Figure 3:
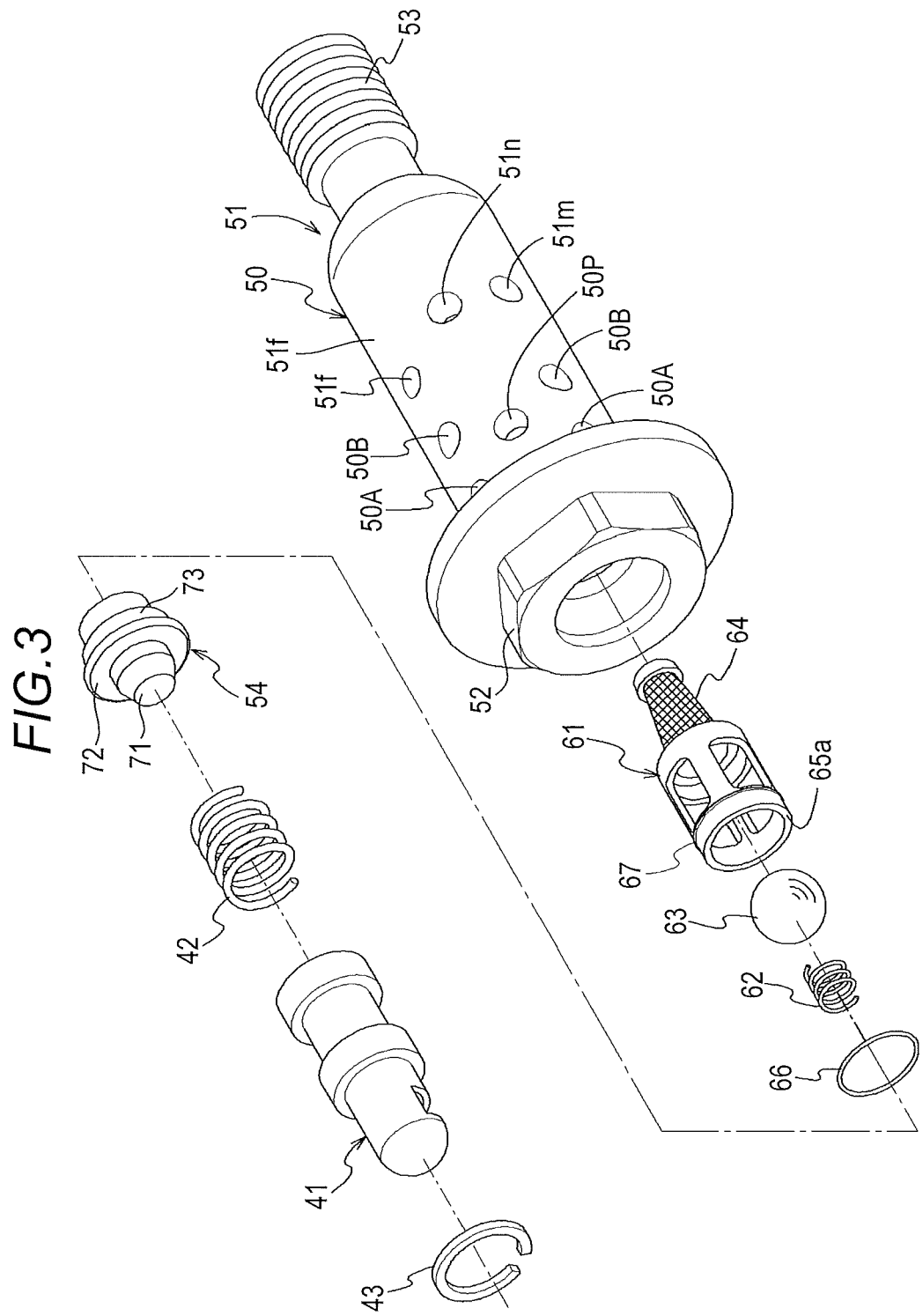
FIG. 3 is an exploded perspective view illustrating a bolt member provided with a fluid control valve.
Figure 4:
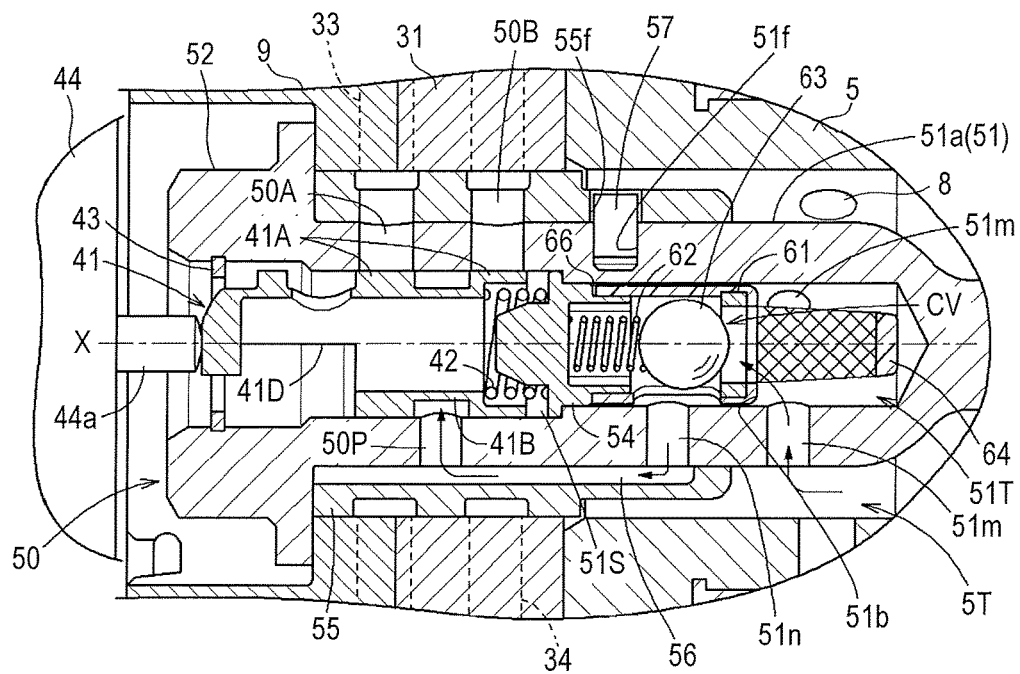
FIG. 4 is a sectional view illustrating the bolt member and a flow passage in the vicinity of the bolt member.

As illustrated in FIG. 1, FIG. 3, and FIG. 4, the connecting bolt 50 is provided with a bolt body 51 (example of the bolt member) a portion of which is cylindrical, a cylindrical sleeve 55 externally fitted in a cylindrical portion 51*a* of the bolt body 51, and an engagement pin 57 as an engagement member positioning these portions.

In the intake camshaft 5, a female threaded portion 5S is formed around the rotary axis X, and an inside space of a shaft 5T having a larger diameter than the female threaded portion 5S is formed so that the sleeve 55 is tightly fitted. The supply flow passage 8 as described above communicates and the hydraulic oil is supplied from the hydraulic pump P in the inside space of the shaft 5T.

The bolt head 52 is formed on the outer end portion of the bolt body 51, and a male threaded portion 53 is formed on an inner end portion. Based on this configuration, the male threaded portion 53 of the bolt body 51 is screwed to the female threaded portion 5S of the intake camshaft 5, and the internal rotor 30 is fastened to the intake camshaft 5 by rotational operation of the bolt head 52. In this fastening state, an inner end side of the outer periphery (male screw side) of the sleeve 55 being externally fitted in the bolt body 51 is in close contact with the inner peripheral surface of the inside space of the shaft 5T, and an outer end side (bolt head side) is in close contact with the inner peripheral surface of the internal rotor main body 31.

In the inside of the bolt body 51, the hole-shaped cylindrical portion 51*a* is formed towards the male threaded portion 53 from the bolt head 52 (in the direction of rotary axis X). A retainer 54 (one example of a partition body) is press-fitted and fixed to the cylindrical portion 51*a*. The cylindrical portion 51*a* is divided into the spool chamber 51S (one example of a second flow passage) and a hydraulic oil chamber 51T (one example of a first flow passage) as a fluid chamber by the retainer 54.

Solenoid Control Valve

As illustrated in FIG. 4, the solenoid control valve 40 is provided with the spool 41, the spool spring 42, and the electromagnetic solenoid 44.

A pair of pump ports 50P communicating the spool chamber 51S and the outer peripheral surface of the bolt body 51 is formed as a through hole in the bolt body 51. A plurality of advance angle ports 50A and a pair of retard angle ports 50B communicating the spool chamber 51S and the outer peripheral surface of the sleeve 55 are formed as the through hole over the bolt body 51 and the sleeve 55 in the connecting bolt 50.

The advance angle port 50A, the pump port 50P, and the retard angle port 50B are disposed in the inner end side from the outer end side of the connecting bolt 50 in this order. The advance angle port 50A and the retard angle port 50B in the direction as viewed along the rotary axis X are formed in the overlapping positions with each other and the pump port 50P is formed in a position that does not overlap with these ports.

On the outer periphery of the sleeve 55, an annular groove is formed in which the plurality of the advance angle ports 50A communicate and the plurality of the advance angle ports 50A communicate with the plurality of the advance angle flow passages 33 from the annular groove. In the same way, on the outer periphery of the sleeve 55, the annular groove is formed in which the plurality of the retard angle ports 50B communicate and the plurality of the retard angle ports 50B communicate with the plurality of the retard angle flow passages 34 from the annular groove. Furthermore, a plurality of introduction flow passages 56 communicating the intermediate flow passage 51*n* and the pump port 50P are formed in a groove shape on the inner peripheral surface of the sleeve 55.

That is, the sleeve 55 is shaped at a dimension reaching the intermediate flow passage 51*n* from the bolt head 52 of the bolt body 51 and the introduction flow passage 56 is formed in a region avoiding the advance angle port 50A and the retard angle port 50B.

A first engaging portion 51*f* having a recessed shape is formed at a position deviated from a press-fitted and fixed position of the retainer 54 in the direction along the rotary axis X in the bolt body 51, and a second engaging portion 55*f* having a hole shape penetrating in the radial direction is formed in the sleeve 55. Therefore, the engagement pin 57 is provided to engage with both portions over the first engaging portion 51*f* and the second engaging portion 55*f*.

By the engagement of the engaging portions 51*f* and 55*f*, and the engagement pin 57, a relative posture of the rotation around the rotary axis X of the bolt body 51 and the sleeve 55 and a relative position thereof along the rotary axis X are determined. Thereby, the hydraulic oil from the hydraulic oil chamber 51T may be supplied to the pump port 50P via the introduction flow passage 56.

The spool 41 forms an abutting surface on which the plunger 44*a* abuts on the outer end side, forms land portions 41A at two positions in the direction along the rotary axis X, and forms a groove portion 41B at an intermediate position of these land portions 41A. The spool 41 is formed in a hollow and a drain hole 41D is formed on a projecting end of the spool 41. The spool 41 abuts on a stopper 43 provided on an inner peripheral opening of the outer end side of the connecting bolt 50, so that a position of a projecting side is determined.

The solenoid control valve 40 causes the plunger 44*a* to abut on the abutting surface of the spool 41 and controls the amount of projection. Therefore, the solenoid control valve 40 is configured to be capable of setting the spool 41 at a neutral position, a retard angle position, and an advance angle position.

The spool 41 is set at the neutral position illustrated in FIG. 4, so that the advance angle port 50A and the retard angle port 50B are closed by a pair of the land portions 41A of the spool 41. As a result, the supplying and discharging of the hydraulic oil to the advance angle chamber Ca and the retard angle chamber Cb is not preformed and the phase of the valve opening and closing timing control apparatus A is maintained.

The plunger 44a is retracted (operated outwards) on the basis of the neutral position (FIG. 4) by the control of the electromagnetic solenoid 44, so that the spool 41 is set at the advance angle position. The pump port 50P communicates with the advance angle port 50A via the groove portion 41B at the advance angle position. At the same time, the retard angle port 50B communicates with the spool chamber 51S from the inner end of the spool 41. Thereby, the hydraulic oil is supplied to the advance angle chamber Ca, the hydraulic oil flows to the inside of the spool 41 from the retard angle chamber Cb, and the hydraulic oil is discharged from the drain hole 41D. As a result, a rotation phase of the intake camshaft 5 is displaced in the advance angle direction Sa.

In a state where the locking mechanism L is in a lock state, the spool 41 is set at the advance angle position and in a case where the hydraulic oil is supplied to the advance angle flow passage 33, the hydraulic oil is supplied to the locking recess portion of the locking mechanism L from the advance angle flow passage 33. Therefore, the locking member 26 is detached from the locking recess portion and the lock state of the locking mechanism L is released.

The plunger 44a is projected (operated inwards) on the basis of the neutral position (FIG. 4) by the control of the electromagnetic solenoid 44, so that the spool 41 is set at the retard angle position. The pump port 50P communicates with the retard angle port 50B via the groove portion 41B at the retard angle position. At the same time, the advance angle port 50A communicates with a drain space (space continued to the outer end side from the spool chamber 51S). Thereby, the hydraulic oil is supplied to the retard angle chamber Cb and at the same time the hydraulic oil is discharged from the advance angle chamber Ca. As a result, the rotation phase of the intake camshaft 5 is displaced in the retard angle direction Sb. The retard angle position coincides with the position in which the spool 41 abuts on the stopper 43 by the biasing force of the spool spring 42.

The spool chamber 51S is formed in a cylinder inner surface shape and the spool 41 as described above is reciprocally movably accommodated along the rotary axis X in the spool chamber 51S. Therefore, the spool spring 42 is disposed between the inside end of this spool 41 and the retainer 54. Thereby, the spool 41 is biased so as to project in the direction of the outer end side (direction of the bolt head 52).

As illustrated in FIG. 4, in the bolt body 51, the plurality of acquisition flow passages 51m communicating the hydraulic oil chamber 51T and the inside space of the shaft 5T are formed and the plurality of intermediate flow passages 51n are formed between the hydraulic oil chamber 51T and the outer peripheral surface of the bolt body 51.

Figure 5:
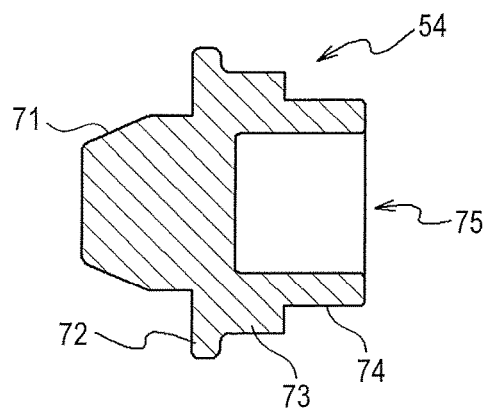
FIG. 5 is a sectional view of a partition body.
Figure 6:
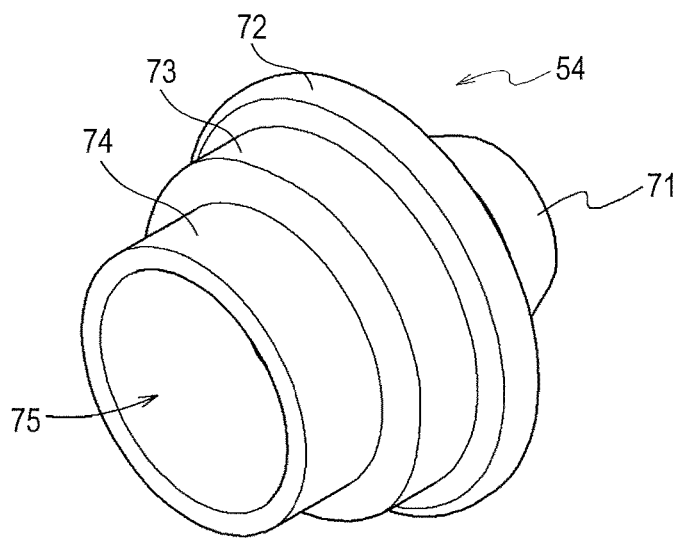
FIG. 6 is a perspective view of the partition body.
Figure 7:
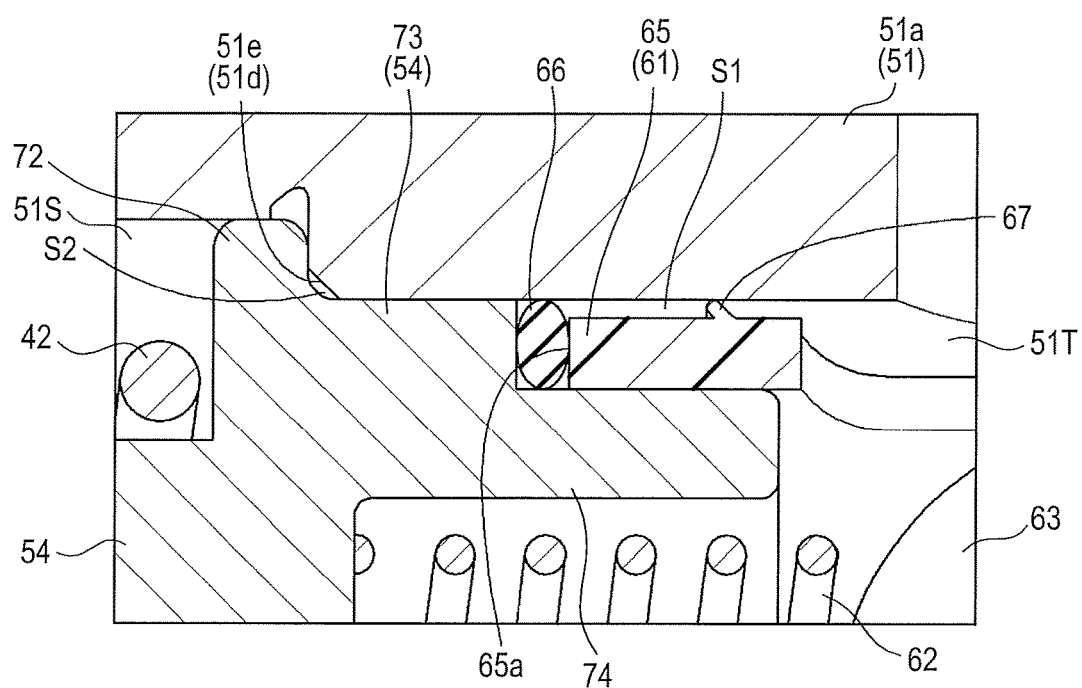
FIG. 7 is a sectional view illustrating a main part of a flow passage partition structure.

As illustrated in FIG. 5 to FIG. 7, the retainer 54 has a locking portion 71, a flange 72, a press-fit portion 73, and an engaging portion 74 from the spool chamber 51S side in order. The locking portion 71 projects towards the spool chamber 51S from the flange 72 and holds the spool spring 42. A stepped portion 51d is disposed at a boundary between the spool chamber 51S and the hydraulic oil chamber 51T in the cylindrical portion 51a, and the flange 72 abuts on the stepped portion 51d. The press-fit portion 73 is press-fitted into the inner peripheral surface of the cylindrical portion 51a. The engaging portion 74 has a small diameter than that of the press-fit portion 73 and is engaged with a ball holder (example of the valve housing body) 61 of a valve body described later.

A check valve CV is provided in the flow passage to send the hydraulic oil from the acquisition flow passage 51m to the intermediate flow passage 51n in the hydraulic oil chamber 51T. This check valve CV is configured with the ball holder 61 (one example of the valve housing body), a check spring 62, and a check ball 63 (one example of the valve body). The check ball 63 regulates a flow direction of the hydraulic oil to the fluid pressure chamber C.

The retainer 54 is provided with a hole portion 75 which is formed by opening on the side of the hydraulic oil chamber 51T along the rotary axis X. The check spring 62 is disposed between the hole portion 75 of the retainer 54 and the check ball 63 and the check ball 63 is in pressure contact with an opening of the ball holder 61 by the biasing force of the check spring 62 to close the flow passage. An oil filter 64 to remove dust from the hydraulic oil flowing toward the check ball 63 is provided in the ball holder 61.

As illustrated in FIG. 4 and FIG. 7, the ball holder 61 is open towards the spool chamber 51S, an end portion of the spool chamber 51S side is configured as an engaged portion 65 externally fitted to the engaging portion 74 of the retainer 54. The ball holder 61, for example, is configured with a resin material or the like. The spool chamber 51S side is opposed to the press-fit portion 73 of the retainer 54, and the hydraulic oil chamber 51T side is opposed to the stepped portion 51b of the cylindrical portion 51a in the ball holder 61. That is, the position of the ball holder 61 is defined by the press-fit portion 73 and the stepped portion 51b. An O-ring 66 is disposed between the press-fit portion 73 and the engaged portion 65. The O-ring 66 is configured with an elastic material, and causes a repulsive force between the press-fit portion 73 (example of another portion which defines the position of the valve housing body) and the ball holder 61. The ball holder 61 receives the repulsive force of the O-ring 66 so that the end portion 61a of the hydraulic oil chamber 51T side is pressed against the stepped portion 51b. Thereby, the position of the ball holder 61 is held in the direction of the rotary axis X by the O-ring 66.

The ball holder 61 abuts the stepped portion 51b of the bolt body 51 and is sealed. A leakage of the hydraulic oil via a gap between the bolt body 51 and the ball holder 61 can be prevented. Assembly of the check valve CV to the bolt body 51 is performed by the check valve CV of a state where the O-ring 66 and the ball holder 61 are mounted on the retainer 54 being inserted into the cylindrical portion 51a.

A projection portion 67 (example of an abutting portion) is disposed in a circumferential direction on the outer peripheral surface of the engaged portion 65. The projection portion 67 is integrally formed, for example, with the engaged portion 65 made of resin. The projection portion 67 is laid down by the contact with the inner peripheral surface of the cylindrical portion 51a to seal to and from the inner peripheral surface of the cylindrical portion 51a. Thereby, a space S1 is formed which functions as the foreign matter reservoir between the engaged portion 65 and the cylindrical portion 51a, and closer to the side of the press-fit portion 73 than the projection portion 67.

When the retainer 54 is press-fitted into the bolt body 51, the inner surface of the bolt body 51 is cut and chips are generated depending on a diameter dimension. However, since the space S1 is disposed at a rear side in the insertion direction of the press-fit portion 73, the chips (foreign matter) are confined in the space S1 so that the outflow of foreign matters into the flow passage may be prevented.

The foreign matter generated when the retainer 54 is press-fitted into the bolt body 51 may be generated on the upper stream side in an insertion direction of the press-fit portion 73. Therefore, a space S2 is formed functioning as the foreign matter reservoir between the stepped portion 51d disposed at the boundary between the spool chamber 51S and the hydraulic oil chamber 51T, and a base portion in the radial direction of the flange 72 of the retainer 54. A corner portion 51e of the stepped portion 51d is chamfered so as to be extended in the space S2. Thereby, the foreign matter which is generated on the upper stream side in the insertion direction of the press-fit portion 73 is confined in the space S2 so that the outflow of foreign matter into the flow passage may be prevented.

In a case where the pressure of the hydraulic oil supplied to the hydraulic oil chamber 51T exceeds the predetermined value, the check valve CV opens the flow passage against the biasing force of the check spring 62 and in a case where the pressure is decreased less than the predetermined value, the check valve CV closes the flow passage by the biasing force of the check spring 62. By this operation, when the pressure of the hydraulic oil is decreased, reverse flow of the hydraulic oil from the advance angle chamber Ca or the retard angle chamber Cb is prevented and variation of the phase of the valve opening and closing timing control apparatus A is suppressed. Even in a case where the pressure of a downstream side of the check valve CV exceeds the predetermined value, this check valve CV performs closing operation.

Figure 8:
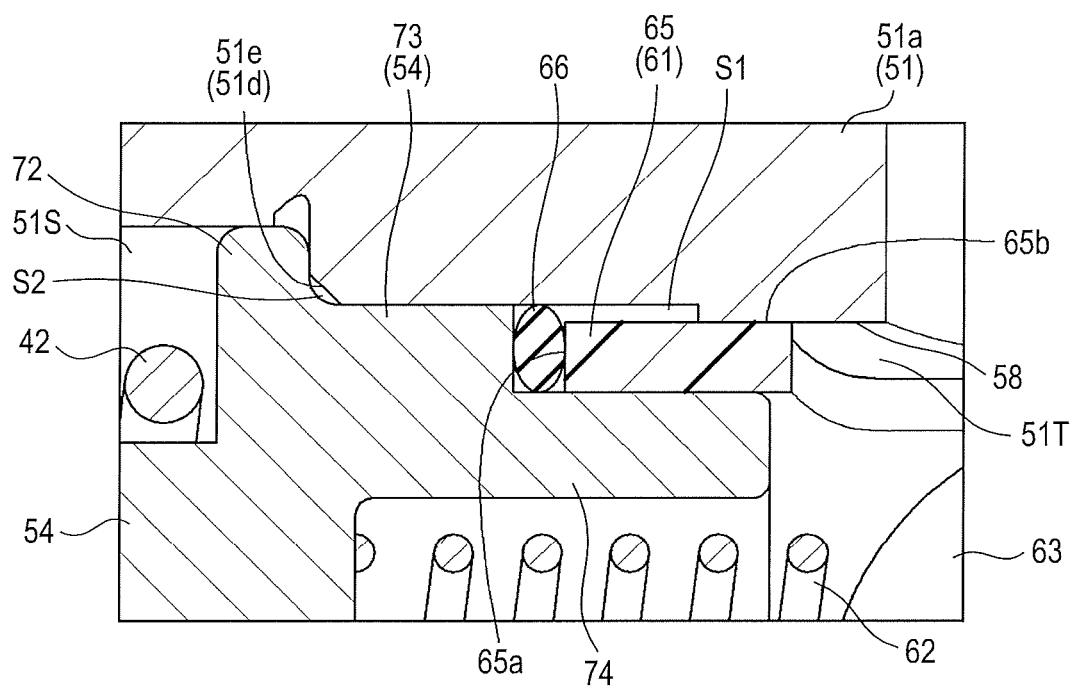
FIG. 8 is a sectional view illustrating a main part of a flow passage partition structure of another embodiment.

Other Embodiment (1) In the above embodiment, although an example in which the abutting portion of the engaged portion 65 which abuts on the cylindrical portion 51a is configured by the projection portion 67 is described, as illustrated in FIG. 8, a small diameter portion 58 on which a portion 65b of the hydraulic oil chamber 51T side abuts on the outer peripheral surface of the engaged portion 65 may be disposed on the inner peripheral surface of the cylindrical portion 51a, instead of the projection portion 67. Thereby, the abutting portion which abuts on the cylindrical portion 51a becomes the portion 65b, and the space S1 is formed which functions as the foreign matter reservoir between the engaged portion 65 and the cylindrical portion 51a, and closer to the press-fit portion 73 side than the abutting portion 65b.

Figure 9:
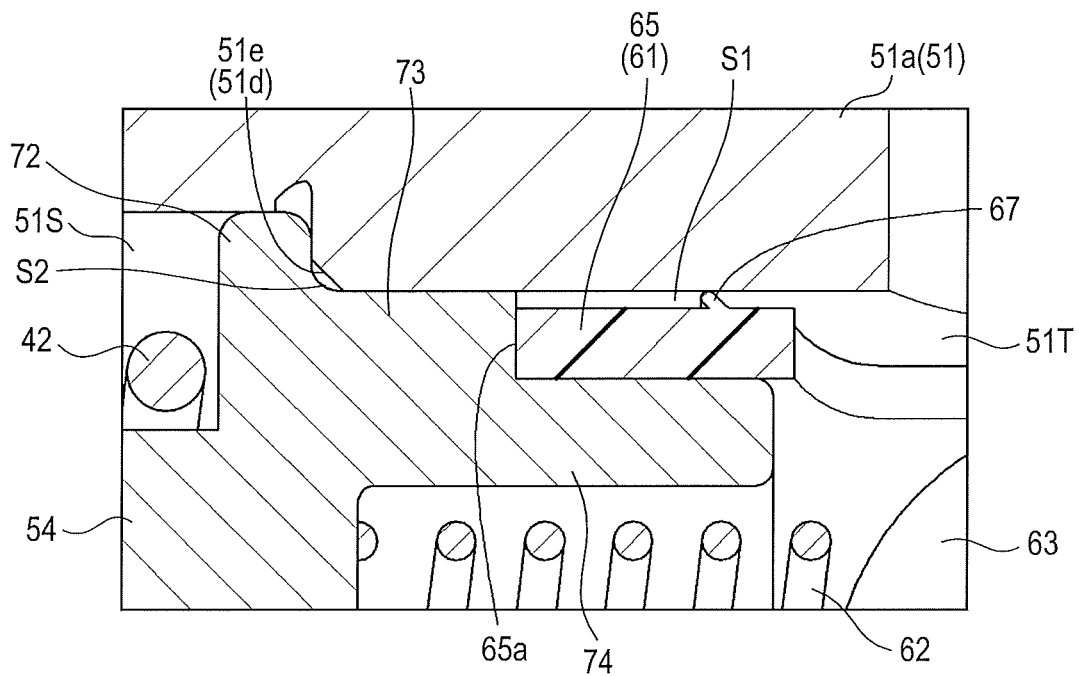
FIG. 9 is a sectional view illustrating a main part of a flow passage partition structure of still another embodiment.

(2) In the above embodiment, although an example in which the O-ring 66 is disposed between the press-fit portion 73 and the end portion 65a of the engaged portion 65 is described, as illustrated in FIG. 9, a configuration in which the O-ring 66 is not disposed between the press-fit portion 73 and the end portion 65a of the engaged portion 65 may be adopted. In this case, for example, an elastic portion which has a sealing function is disposed at the portion where the ball holder 61 is opposed to the stepped portion 51b of the bolt body 51.

A feature of a valve opening and closing timing control apparatus according to an aspect of this disclosure resides in that the valve opening and closing timing control apparatus includes a driving side rotor that synchronously rotates with a crankshaft of an internal combustion engine, a driven side rotor that is disposed coaxially with the driving side rotor and synchronously rotates with a camshaft of the internal combustion engine, a fluid pressure chamber that is formed on at least one of the driving side rotor and the driven side rotor, and is partitioned into an advance angle chamber and a retard angle chamber, a bolt member that is disposed coaxially with a rotary axis of the driven side rotor, connects the driven side rotor and the camshaft, and is provided with a cylindrical portion coaxial with the rotary axis, a partition body that is provided with a press-fit portion press-fitted into the cylindrical portion and partitions the cylindrical portion into a first flow passage and a second flow passage for use for supplying and discharging working fluid to and from the fluid pressure chamber, a valve body that opens and closes the first flow passage, and a valve housing body that accommodates the valve body, an engaging portion which has a smaller diameter than that of the press-fit portion is provided on the first flow passage side of the press-fit portion, and the valve housing body is provided with an engaged portion which is externally fitted to the engaging portion, and the engaged portion is provided with an abutting portion which abuts on the cylindrical portion and a space is formed which functions as a foreign matter reservoir between the engaged portion and the cylindrical body, and closer to the press-fit portion side than the abutting portion.

When the partition body is press-fitted into the cylindrical portion of the bolt member, the inner surface of the bolt member is cut and chips are generated by the press-fit portion depending on a diameter dimension. If the chips as foreign matters intrude into the flow passage, inconvenience such as adverse effects on the operation of the valve disposed in the flow passage occurs. However, according to this configuration, the space is formed which functions as the foreign matter reservoir between the engaged portion of the valve housing body, which is externally fitted to the engaging portion having a smaller diameter than that of the press-fit portion, and the cylindrical portion on a rear side in an insertion direction of the press-fit portion, and closer to the press-fit portion side than the abutting portion of the engaged portion to the cylindrical portion. Thereby, the foreign matters which are generated by the press-fitting of the partition body are confined in the space so that the outflow of the foreign matters into the flow passage can be prevented.

Another feature of the aspect of this disclosure resides in that a stepped portion is disposed at a boundary between the first flow passage and the second flow passage in the cylindrical portion, and the partition body includes a flange, a portion of which abuts on the stepped portion, in a position adjacent to the press-fit portion, and a space is provided which functions as a foreign matter reservoir between a base portion of the flange in radial direction and the stepped portion.

The chips that are generated when press-fitting the partition body into the cylindrical portion of the bolt may be generated on the second flow passage side which is an upper stream side in the insertion direction of the press-fit portion. Therefore, according to this configuration, the flange provided on the partition body and the stepped portion formed on the cylindrical portion of the bolt member partially abut on each other, and the space functioning as the foreign matter reservoir is provided between the base portion of the flange in the radial direction and the stepped portion. Thereby, the foreign matters which are generated by the press-fitting of the partition body are confined in the space so that the outflow of the foreign matters into the flow passage can be prevented.

A feature of a valve opening and closing timing control apparatus according to another aspect of this disclosure resides in that the valve opening and closing timing control apparatus includes a driving side rotor that synchronously rotates with a crankshaft of an internal combustion engine, a driven side rotor that is disposed coaxially with the driving side rotor and synchronously rotates with a camshaft of the internal combustion engine, a fluid pressure chamber that is formed on at least one of the driving side rotor and the driven side rotor, and is partitioned into an advance angle chamber and a retard angle chamber, a bolt member that is disposed coaxially with a rotary axis of the driven side rotor, connects the driven side rotor and the camshaft, and is provided with a cylindrical portion coaxial with the rotary axis, a partition body that is provided with a press-fit portion press-fitted into the cylindrical portion, and partitions the cylindrical portion into a first flow passage and a second flow passage for use for supplying and discharging working fluid to and from the fluid pressure chamber, a valve body that opens and closes the first flow passage, and a valve housing body that accommodates the valve body, and an engaging portion which has a smaller diameter than that of the press-fit portion is provided on the first flow passage side of the press-fit portion, the valve housing body is provided with an engaged portion which is externally fitted to the engaging portion, a small diameter portion is provided which abuts on the engaged portion in the bolt member and a space is formed which functions as a foreign matter reservoir between the engaged portion and the cylindrical body, and closer to the press-fit portion side than the small diameter portion.

Another feature of the valve opening and closing timing control apparatus resides in that the valve opening and closing timing control apparatus further includes an elastic portion that has a sealing function between the press-fit portion and an end portion of the engaged portion.

This disclosure may be used for the valve opening and closing timing control apparatus provided with the partition body that partitions a flow passage space for circulating fluid in an inner side of the bolt that fixes the driven side rotor to the camshaft.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening and closing timing control apparatus comprising:
    a driving side rotor that synchronously rotates with a crankshaft of an internal combustion engine;
    a driven side rotor that is disposed coaxially with the driving side rotor and synchronously rotates with a camshaft of the internal combustion engine;
    a fluid pressure chamber that is formed on at least one of the driving side rotor and the driven side rotor, and is partitioned into an advance angle chamber and a retard angle chamber;
    a bolt member that is disposed coaxially with a rotary axis of the driven side rotor, connects the driven side rotor and the camshaft, and is provided with a cylindrical portion coaxial with the rotary axis;
    a partition body that is provided with a press-fit portion press-fitted into the cylindrical portion, and partitions the cylindrical portion into a first flow passage and a second flow passage for use for supplying and discharging working fluid to and from the fluid pressure chamber;
    a valve body that opens and closes the first flow passage; and
    a valve housing body that accommodates the valve body,
    wherein an engaging portion which has a smaller diameter than that of the press-fit portion is provided on the first flow passage side of the press-fit portion, and the valve housing body is provided with an engaged portion which is externally fitted to the engaging portion,
    wherein the engaged portion is provided with an abutting portion which abuts on the cylindrical portion and a first space is formed which functions as a foreign matter reservoir between the engaged portion and the cylindrical body, and closer to the press-fit portion side than the abutting portion.

2. The valve opening and closing timing control apparatus according to claim 1,
    wherein a stepped portion in the cylindrical portion is disposed at a boundary between the first flow passage and the second flow passage, and the partition body includes a flange, a portion of which abuts on the stepped portion, in a position adjacent to the press-fit portion, and
    wherein a second space is provided which functions as a foreign matter reservoir between a base portion of the flange in radial direction and the stepped portion.

3. The valve opening and closing timing control apparatus according to claim 1, further comprising:
    an elastic portion that has a sealing function between the press-fit portion and an end portion of the engaged portion.

4. A valve opening and closing timing control apparatus comprising:
    a driving side rotor that synchronously rotates with a crankshaft of an internal combustion engine;
    a driven side rotor that is disposed coaxially with the driving side rotor and synchronously rotates with a camshaft of the internal combustion engine;
    a fluid pressure chamber that is formed on at least one of the driving side rotor and the driven side rotor, and is partitioned into an advance angle chamber and a retard angle chamber;
    a bolt member that is disposed coaxially with a rotary axis of the driven side rotor, connects the driven side rotor and the camshaft, and is provided with a cylindrical portion coaxial with the rotary axis;
    a partition body that is provided with a press-fit portion press-fitted into the cylindrical portion, and partitions the cylindrical portion into a first flow passage and a second flow passage for use for supplying and discharging working fluid to and from the fluid pressure chamber;
    a valve body that opens and closes the first flow passage; and
    a valve housing body that accommodates the valve body,
    wherein an engaging portion which has a smaller diameter than that of the press-fit portion is provided on the first flow passage side of the press-fit portion, and the valve housing body is provided with an engaged portion which is externally fitted to the engaging portion,
    wherein a small diameter portion in the bolt member abuts the engaged portion and a space is formed which functions as a foreign matter reservoir between the engaged portion and the cylindrical body, and closer to the press-fit portion side than the small diameter portion.

5. The valve opening and closing timing control apparatus according to claim 4, further comprising:

an elastic portion that has a sealing function between the press-fit portion and an end portion of the engaged portion.

* * * * *